United States Patent Office 3,487,052
Patented Dec. 30, 1969

3,487,052
BENZOTHIAZOLE-2-SULFENAMIDE TYPE CURE ACCELERATORS FOR MERCAPTO POLYMERS
Edward G. Millen, Princeton, N.J., and Paul A. Koons, Yardley, Pa., assignors to Thiokol Chemical Corporation, Bristol, Pa., a corporation of Delaware
No Drawing. Filed Dec. 13, 1966, Ser. No. 601,337
Int. Cl. C08g 23/20
U.S. Cl. 260—79               14 Claims

ABSTRACT OF THE DISCLOSURE

Liquid polymers containing —SH groups are cured with inorganic oxidizing agents in the presence of benzothiozole-sulfenamide type compounds which have an accelerating or synergistic effect on the curing reaction.

BACKGROUND OF THE INVENTION

This invention relates to novel curable liquid —SH containing polymer systems and to the cured products that may be produced therefrom. More particularly this invention relates to oxidatively curable liquid —SH containing polymer systems utilizing thiazole and thiazoline compounds as co-curing agents in combination with organic and inorganic oxygen-containing curing agents.

Liquid —SH containing polymers are used extensively in sealants and caulking compositions, especially in the building and automotive industries; for castings, e.g. solid rocket propellants; for leather and textile impregnating agents; for adhesives, coatings etc.

Depending upon the requirements of the particular application, and the nature of the cure systems, the components of the curable liquid —SH containing polymer systems may be packaged as one- or two-part systems. One-part systems are those in which all the components are stored together with no appreciable reaction taking place until activated by some external influence such as heat, surface application of curing accelerators, exposure to moisture in the atmosphere, etc. Such a moisture-activatable composition is described in U.S. 3,225,017.

Two-part systems are those in which the reactive components are stored in separate packages and combined just prior to use. This type of system is most common and usually involves the storage of liquid polymer and curing agent in separate packages, as for example $Pb_2$ cured liquid polyalkylene polysulfide compositions. In another package arrangement, the polymer and curing agent may be stored in one package with a suitable accelerator being stored in a second package.

Liquid polymers containing a plurality of —SH groups may be cured with compounds which react with the —SH groups in such a way as to condense or unite lower molecular weight segments to form higher molecular weight solid materials. Commonly such polymers are oxidatively cured with organic or inorganic oxidizing agents whereby pairs of —SH groups in the liquid polymers are oxidized to —SS— groups thus promoting the formation of solid higher molecular weight materials. Often the reaction between an oxidizing agent and an —SH containing polymer is too slow for practical purposes, particularly at room temperatures, and the addition of an accelerator is required. Common accelerators which have been used in combination with oxidizing agents for the curing of liquid —SH containing polymers are elemental sulfur and alkaline compounds such as ammonia and amines e.g. hexamethylene tetramine, 2,4,6-tris(dimethylaminomethyl) phenol, tributylamine etc.

SUMMARY OF THE INVENTION

It has now been found that certain organic sulfur-containing compounds containing a thiazole type ring structure are useful as co-curing agents in combination with organic and inorganic oxygen-containing curing agents for the cure of —SH containing liquid polymers. These co-curing agents in some cases act as accelerators i.e., they speed up the curing process. In other cases, they appear to have a synergistic action, in that they make possible a cure of the liquid polymers with certain oxidizing agents which alone do not effect any appreciable cure. While the effect of the co-curing agents used in the present invention may be shown at elevated temperatures as well as at room temperature, the most surprising results are obtained at room temperature.

It is an object of this invention, therefore, to provide a variety of novel curing systems for —SH containing liquid polymers suitable for use at room temperature or elevated temperature in one-part or two-part compositions.

DESCRIPTION OF THE PREFERRED EMBODIMENTS

The organic sulfur-containing co-curing agents useful in the present invention are compounds containing thiazole or thiazoline rings having a sulfur bearing group attached to the ring in the 2-position.

Representative compounds are the following:

| Chemical name | Structure |
|---|---|
| 2-mercaptobenzothiazole | (benzothiazole ring)—C—SH |
| Benzothiazolyl disulfide | (benzothiazole)—C—S—S—C—(benzothiazole) |
| N-oxydiethylenebenzothiazole-2-sulfenamide | (benzothiazole)—C—S—N(CH$_2$—CH$_2$—O—CH$_2$—CH$_2$) |

| Chemical name | Structure |
|---|---|
| N-cyclohexylbenzothiazole-2-sulfenamide. | (benzothiazole)–C–S–N(H)–CH(CH₂–CH₂)(CH₂–CH₂)CH₂ |
| N,N-diisopropylbenzothiazole-2-sulfenamide. | (benzothiazole)–C–S–N[CH(CH₃)₂][CH(CH₃)CH₃] |
| Zinc salt of 2-mercaptobenzothiazole | [(benzothiazole)–C–S–]₂Zn |
| 1,3-bis(2-benzothiazolylmercaptomethyl) urea. | [(benzothiazole)–C–S–CH₂–NH]₂C=O |
| 2-mercaptothiazoline | HC–S, HC–N, C–SH |
| N,N-diethylbenzothiazole-2-sulfenamide. | (benzothiazole)–C–S–N–(C₂H₅)₂ |
| 2-(2,6-dimethyl-4-morpholinothio)-benzothiazole. | (benzothiazole)–C–S–N(CH₂–CH(CH₃))₂O |
| N-t-butylbenzothiazole-2-sulfenamide | (benzothiazole)–C–S–NH–C(CH₃)₃ |

The benzothiazole-2-sulfenamides type compounds contemplated herein correspond to the general formula

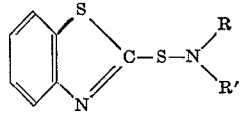

wherein R and R' may be the same or different and when taken singly are selected from the group consisting of hydrogen, alkyl, branched alkyl and cycloalkyl groups and when taken collectively with the nitrogen atom to which they are attached, form a heterocyclic group selected from the group consisting of: (a) azahydrocarbon, (b) azathiahydrocarbon, (c) azaoxahydrocarbon, and (d) azaoxathiahydrocarbon groups.

Examples of the above heterocyclic groups are

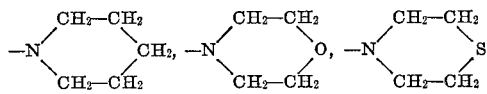

and

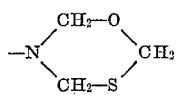

The benzothiazole co-curing agents of the present invention may have substituents such as halogen, alkyl, nitro groups, etc. on the benzene or heterocyclic ring. The organic sulfur-containing co-curing agents, according to the present invention, may each be used singularly or in various combinations with one another.

The oxidizing agents, whose curing action on liquid —SH containing polymers may be accelerated or enhanced by the above mentioned types of sulfur-containing compounds in accordance with the present invention, include inorganic oxides such as ZnO, PbO, MgO, CaO, BaO, $Sb_2O_3$, $Sb_2O_5$, $As_2O_3$, $As_2O_5$, $Cr_2O_3$, CuO, CoO, $Pb_3O_4$, FeO, $Fe_2O_3$, $Fe_3O_4$, $ZnO_2$, $MnO_2$, $Mg_2O_2$, $PbO_2$, $CaO_2$, $BaO_2$, $SeO_2$, $TeO_2$, and $Li_2O_2$; organic peroxides such as dicumyl peroxide, benzoyl peroxide, stearoyl peroxide, lauroyl peroxide, methyl ethyl ketone peroxide, urea peroxide, cumene hydroperoxide, t-butyl hydroperoxide, and t-butyl perbenzoate; chromates and dichromates such as sodium, potassium, zinc, lead, and ammonium chromates and dichromates; permanganates such as potassium permanganate and barium permanganate; iodates such as potassium iodate; organotin compounds such as dibutyl tin oxide; organic nitro compounds such as dinitrobenzene, trinitrobenzene, and o-nitroanisole; quinoid compounds such as p-quinone dioxime, dimethylglyoxime, quinone and other dioximes; sodium carbonate peroxide; and sodium perborate. The choice of an oxidizing agent is based on its overall performance with respect to a number of requirements including (a) cost of oxidizing agent, (b) stability of oxidizing agent in the formulation, (c) rapid but controllable cure rate, (d) heat stability of the cured polymeric product, (e) lack of adverse effect on adhesion properties, and (f) elastomeric composition. The oxidizing curing agents, according to the present invention, may be used singularly or in various combinations with one another.

The polymers which may be cured by the co-curing systems of the present invention are, generally, polymers containing a plurality of —SH groups, such as, (A) Liquid polysulfide polymercaptan polymers such as described in U.S. Patent 2,466,963;

(B) Liquid polysulfide polymers containing a plurality of —SSH groups such as described in U.S. Ser. No. 290,637 filed June 26, 1963, now abandoned;

(C) Liquid —SH terminated polyethers such as —SH terminated polypropylene glycol as disclosed in U.S. Patent 3,258,495;

(D) —SH terminated hydrocarbon polymers such as —SH terminated polybutadiene (Chem. and Eng. News, Apr. 4, 1966, p. 37), —SH terminated butadiene/acrylonitrile copolymers and the alkanepolythiol, aralkanepolythiol, and arenepolythiol polymers disclosed in U.S. Patents 2,230,390, 2,436,137, and 3,243,411;

(E) Liquid —SH terminated polyurethanes such as disclosed in U.S. patent application Ser. No. 484,097, filed Aug. 31, 1965;

(F) Liquid —SH terminated poly(alkylene sulfide) polymers as disclosed in U.S. Patents 3,056,841 and 3,070,580;

(G) Other polythiol polymers such as disclosed in U.S. patent applications Ser. No. 484,105, Ser. No. 484,118, naw abandoned, and Ser. No. 484,122, all filed Aug. 31, 1965.

The —SH containing polymers, according to the present invention, may be used singularly or in various combinations with one another.

The amount of oxidizing curing agent and sulfur-containing co-curing agent employed in accordance with the present invention may vary substantially depending upon the specific combination of polymer, curing agent and co-curing agent employed. In general, per hundred parts of liquid —SH containing polymer, the amount of curing agent used would be about 1 to 20 parts and the amount of sulfur-octaining co-curing agent used would be about 1 to 10 parts.

The ingredients of the compositions of the present invention may be combined in any of the conventional methods known in the art such as in a three roll paint mill. If desired, and depending upon the work-life requirements for any particular use, the ingredients may be combined in a one-part system or may be separated in two or more parts so that the curing agent and/or accelerator are in one package or container and the polymer is in another package or container.

As shown in the examples below, some of the systems of the present invention are suitable for room temperature curing and others for heat activated curing or both.

The physical and chemical properties of the cured compositions of the present invention may be varied according to the method of application and the specific use intended. Fillers, pigments and reinforcing agents such as titanium dioxide, calcium carbonate, carbon black, silicon dioxide, clays, aluminum powder, iron oxide, rayon floc, etc., may be added if desired. In general, these additives decrease the elongation and increase the Shore hardness, toughness and tensile strength of the cured polymer based systems.

Other additives such as plasticizers e.g. chlorinated biphenyls and adhesive additives e.g. silane, phenolic and epoxy resins may be used in accordance with standard practice in the art.

The following examples illustrate the present invention but are not intended as a limitation on the scope thereof.

In the examples, the term "no cure" is used to indicate that no apparent change in viscosity occurred. The term "cure" indicates that the cured product had a Shore A hardness of approximately 25 or greater. The term "soft cure" is used to describe a cured state intermediate between "cure" and "no cure." The cures at 75° F. were carried out under ambient conditions of humidity. The cures at 180° F. were effected in a standard convection oven.

Examples 1–4

In Examples 2–4, a group of thiazole and thiazoline compounds were each used at two cure temperatures as a co-curing agent in combination with zinc peroxide to cure a liquid polysulfide polymer, designated as LP–31, which may be represented by the formula:

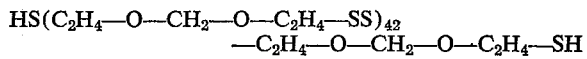

The polymer is essentially linear with a small amount of branching or cross-linking. It has an average weight of 7500 and a viscosity of 800–1400 posies at 25° C.

Example 1 is a control using only zinc peroxide as the curing agent. In each case, the thiazole compound accelerated the cure of the polymer as compared with the control. The cure results are listed in Table I. The cure formation used in each case, by weight, was 25 parts of LP–31, 1.5 parts of zinc peroxide and 1 part of the co-curing agent.

TABLE I

| Example | Co-curing agent | Cure results obtained at— | |
|---|---|---|---|
| | | 75° F. | 180° F. |
| 1 | Control | Soft cure in 12 days | Soft cure in 7 days |
| 2 | 2-mercaptothiazoline | Soft cure in 8 days | Cure in 2 hrs. |
| 3 | 1,3-bis(2-benzothiazolyl-mercaptomethyl) urea | No cure | Soft cure in 4 hrs. |
| 4 | 2-mercaptobenzothiazole | Soft cure in 5 days | Cure in 1 hr. |

Examples 5 and 6

In Example 6, Zetax was used as a co-curing agent with barium manganate to cure LP–31 liquid polysulfide polymer. Example 5 is the control using only barium manganate as the curing agent. The cure formulation used was, by weight, 25 parts of LP–31, 2 parts of barium manganate and 2 parts of the zinc salt of 2-mercaptobenzothiazole.

TABLE II

| Example | 5 | 6 |
|---|---|---|
| Cure results obtained at 75° F. | No cure in 30 days | Soft cure in 14 days. |
| Cure results obtained at 180° F. | No cure in 7 days | Soft cure in 4 hrs. |

Examples 7–10

In Examples 8 and 10, two curing systems according to the present invention were used to cure a liquid —SH terminated polypropylene glycol polymer having a molecular weight of approximately 2000–3000.

Examples 7 and 9 are controls in which only the oxidizing agent was used as a curing agent for the polymer used in Examples 8 and 10. In both cases, the co-curing agent exhibited an accelerating or synergistic effect as compared with the cure using the oxidizing agent alone. The formulations given in the table are presented in parts by weight.

TABLE III

| Example | 7 | 8 | 9 | 10 |
|---|---|---|---|---|
| Formulation: | | | | |
| Polymer | 25 | 25 | 25 | 25. |
| $Li_2O_2$ | 2 | 2 | | |
| $KIO_3$ | | | 2 | 2. |
| Benzothiazolyl disulfide | | 2 | 2 | |
| N-oxydiethylenebenzothiazole-2-sulfenamide | | | | 2. |
| Cure results obtained at 75° F | No cure in 5 days. | Soft cure in 1 hr. | No cure in 5 days. | Cure in 3 hrs. |
| Cure results obtained at 180° F | Soft cure in 1 day. | Cure in ½ hr. | Cure in 5 days. | Cure in ½ hr. |

Examples 11–14

In Examples 12 and 14, two of the curing systems according to the present invention were used to cure a liquid —SH terminated butadiene/acrylonitrile copolymer. This copolymer contains about 24% acrylonitrile and has a viscosity of 35,000 cps. and a specific gravity of 0.98 at 25° C.

Examples 11 and 13 are controls in which only the oxidizing agent was used as the curing agent for the same copolymer. In all cases the co-curing agent exhibited an accelerating or synergistic effect as compared with the cure using the oxidizing agent alone. The formulations given in the table are presented in parts by weight.

TABLE IV

| Example | 11 | 12 | 13 | 14 |
|---|---|---|---|---|
| Formulation: | | | | |
| Copolymer | 25 | 25 | 25 | 25. |
| $(NH_4)_2Cr_2O_7$ | 2 | 2 | | |
| $CaO_2$ | | | 2 | 2. |
| 1,3-bis(2-benzothiazolylmercaptomethyl) urea | | 2 | | |
| N-cyclohexylbenzothiazole-2-sulfenamide | | | | 2. |
| Cure results obtained at 75° F | No cure in 7 days. | No cure in 7 days. | Soft cure in 23 days. | Soft cure in 5 days. |
| Cure results obtained at 180° F | Soft cure in 7 days. | Cure in 7 days. | Soft cure in 3 days. | Cure in 5 hrs. |

Examples 15–25

A filled liquid polysulfide polymer system was tested with various combinations of co-curing agents as shown in Table V and VI. The polymer designated as LP-32, may be represented by the formula:

$$HS(C_2H_4-O-CH_2-O-C_2H_4-S-S)_{23} -C_2H_4-O-CH_2-O-C_2H_4-SH$$

It has an average molecular weight of 4000 and a viscosity of 350–450 poises at 25° C.

In Examples 15–20, 100 parts by weight of LP-32 were mixed with 30 parts by weight of calcium carbonate, 10 parts by weight of titanium dioxide, 3 parts by weight of precipitated, hydrated silica, 10 parts by weight of $ZnO_2$ and 2 parts by weight of co-curing agents shown in Table V. The control contained $ZnO_2$ as the only curing agent.

TABLE V

| Ex. | | Cure results obtained at 75° F. |
|---|---|---|
| 15 | Control | No cure in 7 days. |
| 16 | Benzothiazolyl disulfide | Cure in 4 days. |
| 17 | 2-mercaptobenzothiazole | Cure in 4 days. |
| 18 | N-oxydiethylenebenzothiazole-2-sulfenamide | Cure in 1 day. |
| 19 | N-cyclohexylbenzothiazole-2-sulfenamide | Cure in 1 day. |
| 20 | N,N-diisopropylbenzothiazole-2-sulfenamide | Cure in 4 days. |

In Examples 21–25, 100 parts by weight of LP-32 were mixed with 30 parts by weight of calcium carbonate, 10 parts by weight of titanium dioxide, 3 parts by weight of precipitated, hydrated silica, an inorganic oxidizing agent and 2 parts by weight of a thiazole compound as co-curing agent as shown in Table VI.

TABLE VI

| Ex. | Thiazole compound | Oxidizing agent (parts by weight) | Cure results obtained at 75° F. |
|---|---|---|---|
| 21 | None | $MnO_2$ (6) | Soft cure in 4 days. |
| 22 | N-oxydiethylenebenzothiazole-2-sulfenamide | $MnO_2$ (6) | Soft cure in 1 day. |
| 23 | N-cyclohexyl benzothiazole-2-sulfenamide | $MnO_2$ (6) | Cure in 2 days. |
| 24 | None | $TeO_2$ (8) | Cure in 1 day. |
| 25 | N-oxydiethylenebenzothiazole-2-sulfenamide | $TeO_2$ (8) | Cure in 3 hrs. |

In each of Examples 16–20, 22, 23, and 25, the combination of oxidizing agent with a thiazole co-curing agent produced a faster cure at 75° F. than did the oxidizing agent alone.

As used throughout the text, the term "liquid" with respect to defining the polymer means that the polymer is pourable at room temperature (25° C.).

We claim:
1. A curable composition comprising
   (A) at least one liquid polymer containing a plurality of —SH groups and selected from liquid polysulfide polymercaptan polymer, liquid —SH terminated polypropylene glycol polymer, and liquid —SH terminated butadiene/acrylonitrile copolymer,
   (B) at least one oxidizing curing agent selected from the group consisting of inorganic metal oxides, chromates, permanganates, iodates and perborates, and
   (C) a benzothiazole-2-sulfenamide having the general formula

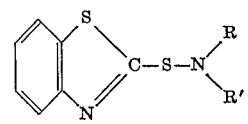

wherein R and R' may be the same or different and when taken singly are selected from the group consisting of alkyl, branched alkyl, and cycloalkyl groups and taken collectively with the nitrogen atom to which they are attached form an azaoxahydrocarbon group.

2. A curable composition according to claim 1 wherein the benzothiazole-2-sulfenamide is selected from the group consisting of: N-oxydiethylenebenzothiazole-2-sulfenamide, N-cyclohexylbenzothiazole-2-sulfenamide, N,N-diisopropylbenzothiazole-2-sulfenamide, and N,N-diethylbenzothiazole-2-sulfenamide.

3. A curable composition as in claim 1 in which at least one of said liquid polymers is a polysulfide polymercaptan polymer.

4. A curable composition as in claim 3 in which at least one of said oxidizing agents is zinc peroxide.

5. A curable composition as in claim 4 in which at least one of said co-curing agents is N-oxydiethylenebenzothiazole-2-sulfenamide.

6. A curable composition as in claim 4 in which at least one of said co-curing agents is N-cyclohexylbenzothiazole-2-sulfenamide.

7. A curable composition as in claim 1 in which at least one of said inorganic oxides is calcium peroxide.

8. A curable composition as in claim 7 in which at least one of said co-curing agents is N-cyclohexylbenzothiazole-2-sulfenamide.

9. A curable composition as in claim 1 in which at least one of said inorganic oxides is manganese dioxide.

10. A curable composition as in claim 9 in which at least one of said co-curing agents is selected from N-oxydiethylenebenzothiazole - 2-sulfenamide and N-cyclohexylbenzothiazole-2-sulfenamide.

11. A curable composition as in claim 1 is which at least one of said inorganic oxides is tellurium dioxide.

12. A curable composition as in claim 11 in which at least one of said co-curing agents is N-oxydiethylenebenzothiazole-2-sulfenamide.

13. A curable composition as in claim 1 in which at least one of said inorganic oxides is potassium iodate.

14. A curable composition as in claim 13 in which at least one of said co-curing agents is N-oxydiethylenebenzothiazole-2-sulfenamide.

References Cited

UNITED STATES PATENTS

| 3,057,832 | 10/1962 | Brock | 260—79 |
| 3,135,716 | 6/1964 | Uraneck et al. | 260—45.5 |
| 3,219,638 | 11/1965 | Warner | 260—79 |
| 3,225,017 | 12/1965 | Seegman et al. | 260—79 |
| 3,234,188 | 2/1966 | Warner | 260—79 |
| 3,331,818 | 7/1967 | Bertozzi | 260—79.1 |

FOREIGN PATENTS 827,375   2/1960   Great Britain.

OTHER REFERENCES

Gaylord: Polyethers, Part III, Polyalkylene Sulfides and other Polythioethers, 1962, pp. 126–132.

Fettes et al.: Industrial and Engineering Chemistry, "Mechanism of Vulcanization of Polysulfide Rubbers," vol. 46, No. 7, July 1954, pp. 1539–1541.

DONALD E. CZAJA, Primary Examiner

M. I. MARQUIS, Assistant Examiner

U.S. Cl. X.R.

117—139.5, 142; 260—33.8, 37, 79.1